July 27, 1965
C. O. LOFGREN
3,196,519
SURFACE BROACHING APPARATUS
Filed Oct. 1, 1962
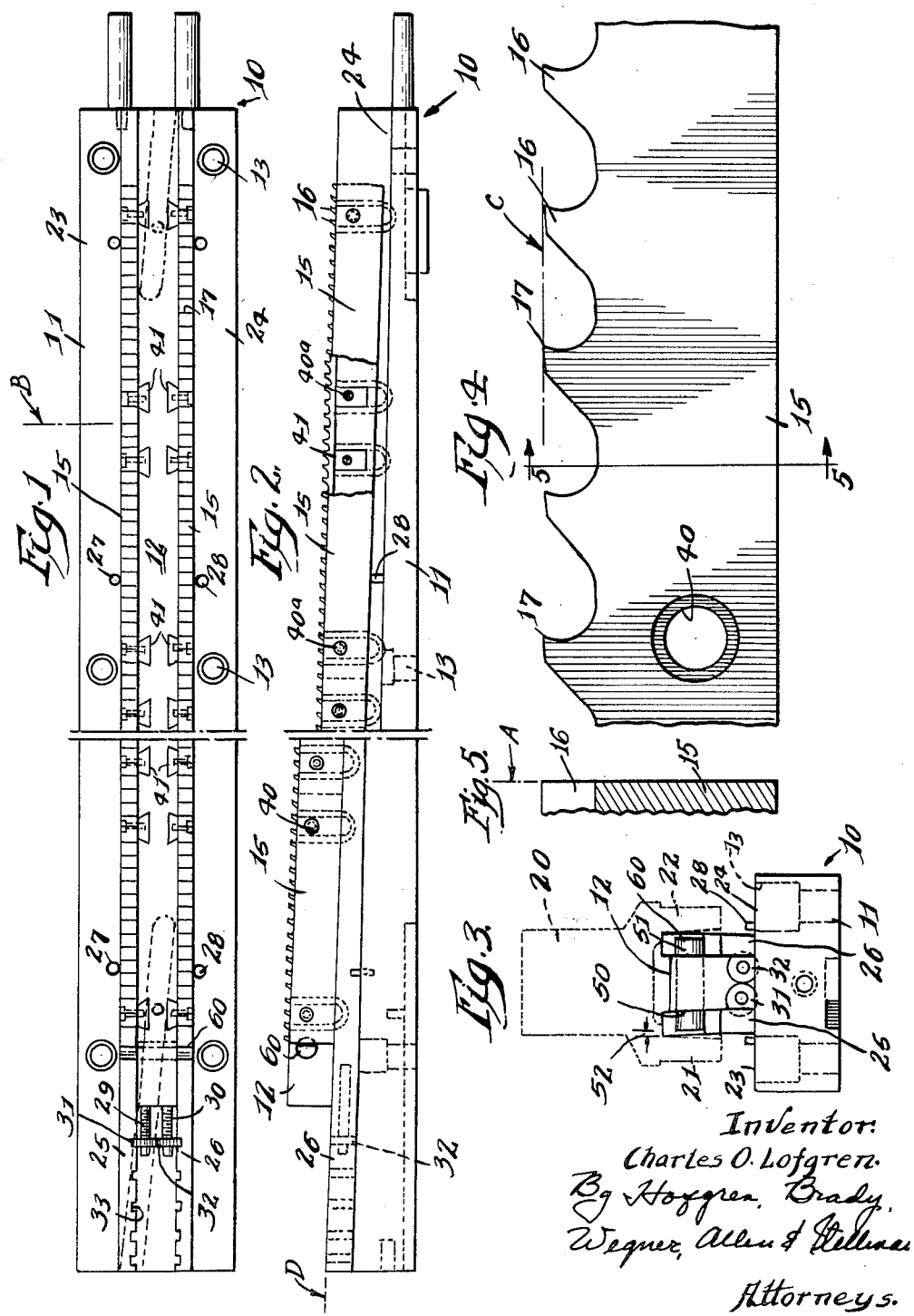
Inventor:
Charles O. Lofgren
By Hofgren, Brady,
Wegner, Allen & Stellman
Attorneys.

United States Patent Office 3,196,519
Patented July 27, 1965

3,196,519
SURFACE BROACHING APPARATUS
Charles O. Lofgren, Rockford, Ill., assignor to Sundstrand Corporation, a corporation of Illinois
Filed Oct. 1, 1962, Ser. No. 227,400
11 Claims. (Cl. 29—95.1)

This invention relates to broaching apparatus and, more particularly, to apparatus for surface broaching.

An object of this invention is to provide new and improved surface broaching apparatus having a holder utilizing relatively simple broach tools with the tools having longer life due to reduced wear and the number of resharpenings permitted.

Another object of this invention is to provide surface broaching apparatus in the form of a broach holder for holding a generally planar broach tool disposed at a compound angle, with the angle in one plane providing the rise per tooth for the tool and the angle in a second plane providing a tool relief angle.

Still another object of the invention is to provide surface broaching apparatus as defined in the preceding paragraph in combination with planar broach tools in which the broach teeth are formed along an edge of the tool without any shear angle and are shaped to permit many resharpenings without any change in part size after regrinding of the broach teeth and the tool relief angle is provided by the bodily disposition of the tools, all the foregoing being accomplished without significant cutting thrust against the broach finish surface.

Further objects and advantages will become apparent from the following detailed description taken in connection with the accompanying drawings in which:

FIG. 1 is a fragmentary plan view of the surface broaching apparatus with a central part broken away;

FIG. 2 is a side elevational view of the apparatus with a central part broken away and with parts of adjacent broach tools broken away;

FIG. 3 is a side elevational view of the apparatus taken looking toward the left-hand end of FIGS. 1 and 2 and with a part being broached shown in association therewith in broken line;

FIG. 4 is a fragmentary elevational view of a planar broach tool; and

FIG. 5 is a fragmentary vertical section taken generally along the line 5—5 in FIG. 4.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in the drawings the surface broaching apparatus includes a holder indicated generally at 10 having an elongate body with a base 11 and an upstanding flange 12 running for substantially the entire length of the body but terminating short thereof at the left-hand end as viewed in FIGS. 1 and 2. The base 11 is provided with a series of openings 13 for securing the apparatus to a broaching machine whereby lengthwise movement of the holder in a direction from left to right, as viewed in FIGS. 1 and 2 causes broaching of one or two surfaces to be broached.

The holder mounts one or more broach tools 15, with a part of one tool being shown in FIG. 4 and a series of the tools being mounted in line at two sides of the flange 12, as shown in the embodiment disclosed in FIG. 1. These tools are each of a planar construction having a series of teeth 16 provided with a cutting edge 17 and a suitable face angle, tooth depth and back-off clearance to permit a substantial number of resharpenings without change in the tooth form. There is no shear angle as shown by line B in FIG. 1 which is at right angles to the body of the tool, so that the broach tools may be mounted at either side of the holder flange 12 in the manner subsequently to be described to thus use substantially the entire transverse length of the teeth. The planar construction of the tool is further illustrated in FIG. 5 wherein the line A which is normal to the top of the tool illustrates the zero relief angle. The zero rise per tooth angle is illustrated by line C in FIG. 4 which is parallel to the bottom of the tool.

For clarity in further describing the structure, reference may be made to FIG. 3 in which a part 20 to be broached is shown in broken line and has a pair of lugs 21 and 22 with opposed interior surfaces that are progressively broached upwardly as viewed in FIG. 3 when the holder moves in the direction previously referred to. The broaching operation is shown substantially completed in FIG. 3 with the teeth of the broach tools then currently cutting being near the top of the lug surfaces.

The broach tools 15 are mounted on the holder 10 at an angle, as shown in FIG. 2, to provide the rise per tooth and this is provided by inclined surfaces 23 and 24 on the top of the holder base which slope downwardly toward the right-hand end thereof as viewed in FIG. 2. This is further illustrated by line D in FIG. 2 which is at an angle to the bottom of the holder and which defines the rise per tooth. In order to provide for height adjustment of the broach teeth to finish height after sharpening, a pair of wedges 25 and 26 are disposed between a series of broach tools 15 and the sloped surfaces of the base 11. The wedge 25 is disposed between one series of broach tools 15 and the sloped base surface 23, with the wedge 26 being similarly located and associated with the sloped surface 24. The wedges are loosely held in position by a series of pins 27 and 28 extending upwardly from the base surfaces 23 and 24.

Means are provided for adjusting the wedges lengthwise and it will be seen that as the wedges 25 and 26 are moved toward the right, as viewed in FIGS. 1 and 2, the broach tools will be caused to move upwardly. This adjustment is accomplished by a pair of adjusting screws 29 and 30 associated with the wedges 25 and 26, respectively. These screws are threaded into the left-hand end of the holder flange 12 for lengthwise adjustment and each have an enlarged head 31 and 32, respectively, engageable in one of a series of notches 33 in each of the wedges. Rotation of the screws will cause lengthwise shift of the wedges relative to the holder with this movement being freely permitted by the pins 27 and 28.

Means for securing the broach tools 15 to the holder comprises a pair of counterbored holes 40 in each of the broach tools 15 to permit the insertion therein of socket head cap screws 40a which pass through the openings and each individually thread into an adjustable block 41 exposed at the faces of the holder flange 12. These blocks are mounted by dovetail connections for retention in the flange and for adjusting movement along a path normal to the slope of the holder surfaces 23 and 24. With this construction, the cap screws may be loosened and the wedges 25 and 26 adjusted to place the tools at the desired height with the blocks 41 adjusting accordingly. As soon as the height is obtained, the cap screws 40a are tightened, which draws the blocks 41 tightly against their ways and holds the broach tools secured in position.

The broach tools 15 are mounted at a compound angle, with the angle in one plane being that previously described to obtain the rise per tooth and obtained by the sloped surfaces 23 and 24. The angle in the other plane, to provide the mounting at a compound angle, is obtained by an upward and outward inclination of opposite faces 50 and 51 of the holder flange 12, to have these faces gradually diverging from each other. The angle of the slope of a face is indicated at 52 and can be so slight as to not readily be shown in a drawing. With the mounting of the tools abutting against the faces 50 and 51, the tools are given a corresponding angle to provide a tool relief or clearance angle so that as the tools in effect move upwardly in FIG. 3 the part of the broach tool beneath the cutting edges of the teeth is out of engagement with the surfaces being broached to thus avoid contact with the finish surface obtained. The previously referred to sloped surfaces 23 and 24 of the holder base 11 have a corresponding slope to maintain the faces 50 and 51 and also the broach tools and wedges normal to these surfaces.

In order to assist in taking up end thrust, a pin 60 passes through the left-hand end of the holder flange 12 and is provided with flats engaging the left-hand end of the tools 15 disposed at the left of the holder with the flats effectively locking the pin 60 in position.

With previous designs of "side cutting" or "nibbling design" of broaching, the tool teeth have had shapes which resulted in the tool cutting undersize after sharpening and which in the machining operation shown in FIG. 3 exerted side load on the lugs of the workpiece. With the construction disclosed herein, the cutting thrust is substantially entirely upward and avoids the need of backup members for the lugs 21 and 22 to counteract the cutting thrust. The holder construction permits the use of broach tools which will cut to size after repeated sharpenings. It will be seen from FIG. 3 that only a part of the transverse length of the cutting edges may be used, so that the tools may be changed from mounting at one side of the holder to the other to double the life of the tool before sharpening is required.

Although a holder is shown using tools at both sides thereof, it will be evident that the principles of the invention may be embodied in a holder mounting tools only at a single side.

I claim:

1. A broach holder and broach tool combination for surface broaching comprising, planar broach tools, a body with a base and an upstanding flange extending along the length thereof, said flange having opposite exposed faces extending upwardly relative to the base and gradually diverging from each other and each adapted to engage the separate planar broach tool positioned thereagainst at a slight outward angle with the broach teeth at a level above the flange, means for positioning the broach tools at an angle inclined to the length of the base to provide a rise per tool comprising a pair of sloped surfaces on said base underlying the location of the broach tools, means for adjusting the height of the broach tools comprising a pair of wedge members associated one with each of said sloped surfaces, means for adjusting said wedge members lengthwise of the base comprising screw means threaded in the base and engaging the wedge members, and means for securing the broach tools to the flange including a plurality of movable dovetailed blocks mounted in said flange and exposed to said faces to each receive a screw passing through the broach tool with the blocks being movable along paths normal to said sloped surfaces.

2. A broach holder and broach tool combination for surface broaching comprising, planar broach tools having teeth with zero relief angle and extending across the entire width of the tool body at a constant height with zero shear angle and zero rise per tooth, a body having opposite exposed faces extending upwardly and gradually diverging from each other and each adapted to engage the separate planar broach tool positioned thereagainst at a slight outward angle with the broach teeth at a level above the faces, means for adjusting the height of the broach tools, and means for securing the broach tools to the body.

3. A broach holder and broach tool combination for surface broaching comprising, a holder body with a base and an upstanding flange extending along the length thereof, said flange having opposite exposed faces extending upwardly relative to the base and gradually diverging from each other, at least a pair of separate planar broach tools positioned one against each face at a slight outward angle with the broach teeth at a level above the flange, said teeth having zero relief angle and extending across the entire width of the tool body at a constant height with zero shear angle and zero rise per tooth, means defining transverse openings in each tool, means for positioning the broach tools at an angle inclined to the length of the base to provide a rise per tooth comprising a pair of sloped surfaces on said base underlying the location of the broach tools, means for adjusting the height of the broach tools comprising a pair of wedge members associated one with each of said sloped surfaces, means for adjusting said wedge members lengthwise of the base, and means for securing the broach tools to the flange including a plurality of movable dovetailed blocks mounted in said flange and exposed to said faces to each receive a screw passing through one of the broach tool openings with the blocks being movable along paths normal to said sloped surfaces.

4. A combination as defined in claim 3 in which a plurality of broach tools are supported one after the other at each of said faces.

5. A broach holder and broach tool combination for surface broaching comprising, planar broach tools having teeth with zero relief angle and extending across the entire width of the tool body at a constant height with zero shear angle and zero rise per tooth, a body with a base and an upstanding flange extending along the length thereof, said flange having opposite exposed faces extending upwardly relative to the base and gradually diverging from each other and each adapted to engage the separate planar broach tool positioned thereagainst at slight outward angle with the broach teeth at a level above the flange, means for positioning the broach tools at an inclined angle to the length of the base to provide a rise per tooth, means for adjusting the height of the broach tools, and means for securing the broach tools to the flange.

6. A broach holder and broach tool combination for surface broaching comprising, a planar broach tool, a body having opposite exposed faces extending upwardly and each adapted to engage the separate planar broach tool positioned thereagainst with the broach teeth at a level above the flange, means for positioning the broach tools at an angle inclined to the length of the base to provide a rise per tooth comprising a pair of sloped surfaces on said base underlying the location of the broach tools, means for adjusting the height of the broach tools comprising a pair of wedge members associated one with each of said sloped surfaces, and means for securing the broach tools to the base including a plurality of movable dovetailed blocks mounted in said body and exposed to said faces to each receive a screw passing through the broach tools with the blocks being movable along paths normal to said sloped surfaces.

7. In a surface broaching apparatus for supporting broach tools comprising, a broach tool having teeth with zero relief angle and extending across the entire width of the tool body at a constant height with zero shear angle and zero rise per tooth, a broach holder having a body with an elongate upstanding mounting surface, said surface sloping upwardly and outwardly at a compound angle to support the tool with the broach teeth above the surface and at an angle to provide a tool relief angle.

8. A broach holder for surface broaching comprising, a body having an exposed face extending upwardly and outwardly and adapted to engage a planar broach tool positioned thereagainst at a slight outward angle with the broach teeth at a level above the body, means for positioning the broach tool at an angle inclined to the length of the base to provide a rise per tooth comprising a sloped surface on said base underlying the location of the broach tool, means for adjusting the height of the broach tool, and means for securing the broach tool to the body including a plurality of movable members mounted in said body and exposed to said face to each receive a screw passing through the broach tool with the members being movable along paths normal to said sloped surface.

9. A broach holder and broach tool combination comprising, a broach holder having a body with an elongate mounting surface sloping upwardly and outwardly at a compound angle to define a tool rise angle and a tool relief angle, a broach tool having a generally flat planar body with parallel sides and having a top edge defined by cutting teeth and a bottom edge parallel thereto, said teeth being of substantially equal height, with the top surfaces of said teeth having a surface terminating in a cutting edge having opposite ends coplanar with said body sides, thereby permitting each tooth to be substantially identical and having zero rise per tooth, the rise being produced by selectively positioning said body bottom edge on said tool holder at said rise angle, said teeth being normal to said body sides to have zero shear angle whereby both ends of said cutting edge of each tooth may be utilized for cutting, and each of said teeth having zero tool relief angle, said tool relief being produced by selectively positioning said flat body on said tool holder at said relief angle.

10. A broach holder and broach tool combination comprising, a broach holder having a body with an elongate mounting surface sloping upwardly and outwardly at a compound angle to define a tool rise angle and a tool relief angle, a broach tool having a generally flat planar body having a top edge defined by cutting teeth and a bottom edge, said body having a substantially rectangular cross section normal to said flat plane and an aperture through said body perpendicular to said flat plane, each of the cutting teeth having a surface terminating in a cutting edge, said cutting edge having opposite ends, said teeth being of substantially equal height thereby providing zero rise per tooth for the tool, each of said teeth extending across the entire tool body and having zero shear angle whereby said ends of the cutting edge of each tooth may be utilized for cutting, and each of said teeth having zero tool relief angle, said tool body being selectively positionable on said holder at said compound angle to provide the rise per tooth and tool relief.

11. A broach holder and broach tool combination comprising, a broach holder having a body with an elongate mounting surface sloping upwardly and outwardly at a compound angle to define a tool rise angle and a tool relief angle, a broach tool having a generally flat planar body having a substantially rectangular cross section normal to said flat plane; and cutting teeth on said body, each of said teeth having a surface terminating in a cutting edge, said cutting edge having opposite ends, said teeth being of substantially equal height thereby providing zero rise per tooth for the tool, said tool body being positionable on said holder at the rise angle to provide a selective rise per tooth, each of said teeth having zero shear angle and extending for the full width of the body whereby both ends of said cutting edge of each tooth may be utilized for cutting, and each of said teeth having zero tool relief angle, said tool body being further positionable on said holder at said tool relief angle to provide tool relief.

References Cited by the Examiner

UNITED STATES PATENTS

| | | | |
|---|---|---|---|
| 475,352 | 5/92 | Smith | 29—95.1 |
| 1,677,815 | 7/28 | Craft | 29—95.1 |
| 1,945,535 | 2/34 | Schilz | 29—95.1 |
| 2,390,722 | 12/45 | Markstrum | 29—95.1 |
| 2,392,823 | 1/46 | Lapointe | 29—95.1 |
| 2,754,568 | 7/56 | Lay | 29—95.1 |
| 2,770,027 | 11/56 | Bonnafe | 29—95.1 |

ANDREW R. JUHASZ, *Primary Examiner.*

WILLIAM W. DYER, JR., *Examiner.*